United States Patent [19]

Bradley et al.

[11] Patent Number: 4,642,010

[45] Date of Patent: Feb. 10, 1987

[54] THREADED FASTENER AND METHOD OF INSTALLING SAME

[75] Inventors: William D. Bradley, Welwyn Garden City; Zia R. Alvi, Hatfield; Raymond D. Lacey, Essendon, all of England

[73] Assignee: Avdel Limited, Welwyn Garden City, England

[21] Appl. No.: 613,731

[22] Filed: May 24, 1984

[30] Foreign Application Priority Data

Jun. 1, 1983 [GB] United Kingdom ................. 8315077

[51] Int. Cl.⁴ ........................ F16B 13/06; F16B 35/00
[52] U.S. Cl. ........................................ 411/69; 411/70; 411/71; 411/72; 411/334; 411/395; 411/501
[58] Field of Search ................. 411/43, 44, 45, 69, 411/70, 71, 72, 333, 334, 378, 386, 395, 501

[56] References Cited

U.S. PATENT DOCUMENTS

| | | | |
|---|---|---|---|
| 1,271,408 | 7/1918 | Wood | 411/395 X |
| 1,655,808 | 1/1928 | Bodkin | 411/72 X |
| 3,424,212 | 1/1969 | Kemper | 411/395 X |
| 3,555,673 | 1/1971 | Summerlin | 411/501 X |
| 3,880,042 | 4/1975 | Binns | 411/43 |
| 4,408,938 | 10/1983 | Maguire | 411/71 |
| 4,411,570 | 10/1983 | Juric | 411/44 X |
| 4,488,843 | 12/1984 | Achille | 411/72 X |
| 4,507,817 | 4/1985 | Staffeld | 411/395 X |

FOREIGN PATENT DOCUMENTS

| | | | |
|---|---|---|---|
| 857142 | 11/1952 | Fed. Rep. of Germany | 411/72 |
| 19448 | 10/1914 | France | 411/386 |
| 507358 | 6/1939 | United Kingdom | 411/43 |
| 640451 | 7/1950 | United Kingdom | 411/72 |

*Primary Examiner*—Thomas J. Holko
*Attorney, Agent, or Firm*—Oblon, Fisher, Spivak, McClelland, & Maier

[57] ABSTRACT

A threaded fastener for installation in threaded engagement with an initially unthreaded apertured workpiece and which after installation can be removed in the manner of a screw or bolt, has a shank and an enlarged head. At least part of the shank intermediate between its ends has an external screw thread having a sharp crest, and can be radially expanded to cause the thread to embed in the workpiece. A bore extends through the head and the entire shank or at least the threaded part of the shank for receiving means for expanding the shank. An end portion of the shank remote from the head may be unthreaded to avoid splitting of the shank during expansion.

The method of installing the fastener involves pulling a tapered mandrel along the bore to expand the shank. The mandrel may have a key-forming head of non-circular cross-section whereby the bore of the fastener can be adopted to receive a key of non-circular cross-section for turning the fastener in the workpiece.

The head of the fastener may be deformable towards the workpiece to clamp another member to the workpiece.

8 Claims, 8 Drawing Figures

U.S. Patent  Feb. 10, 1987  Sheet 1 of 3  4,642,010
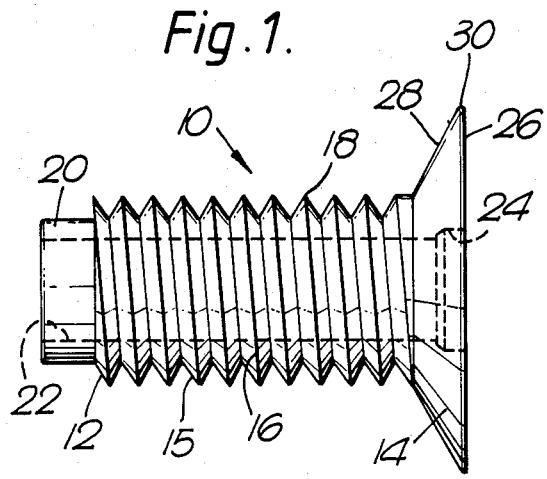
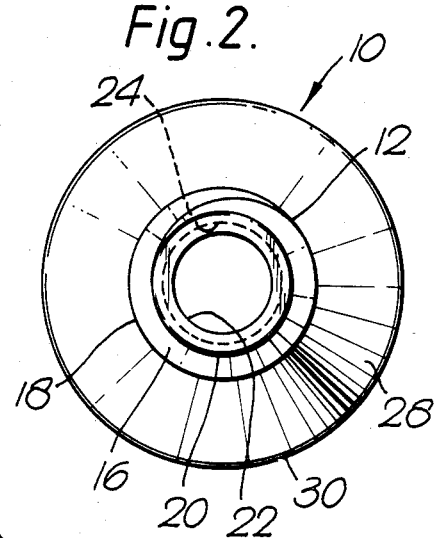
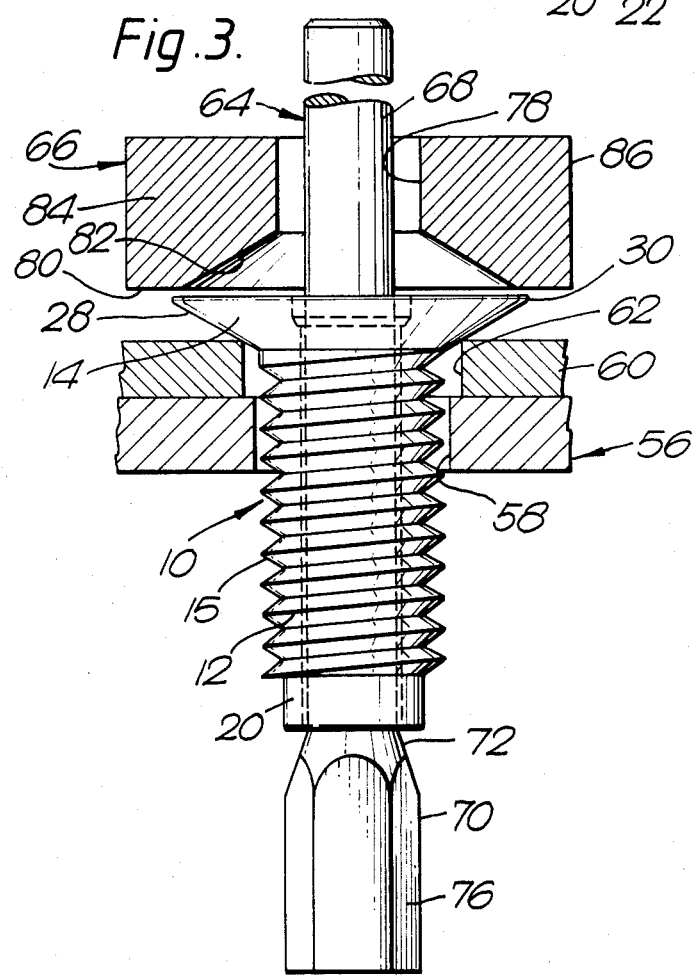

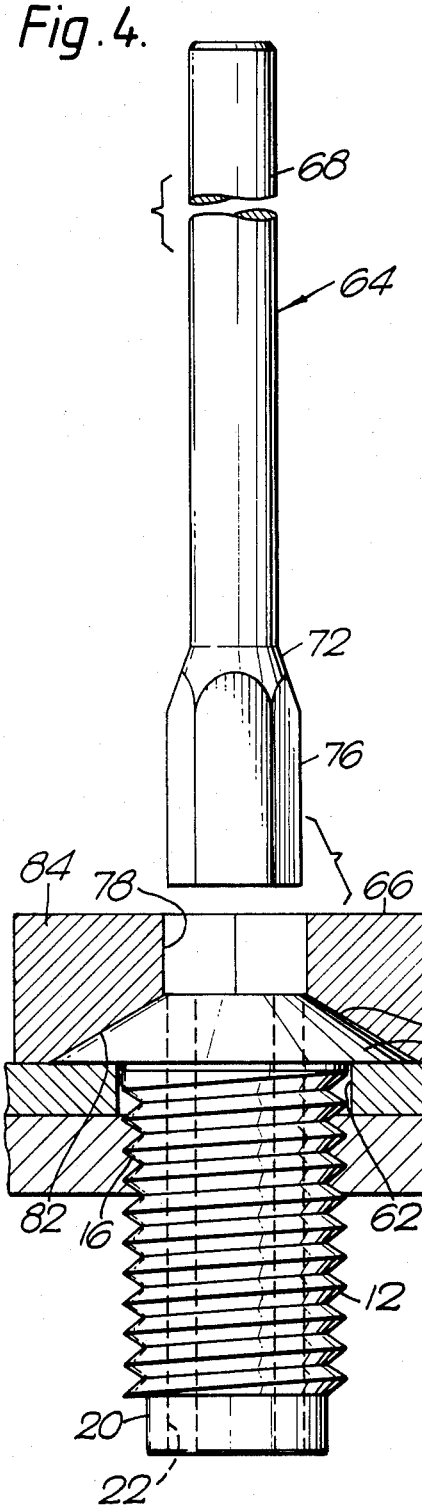
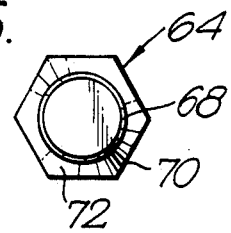
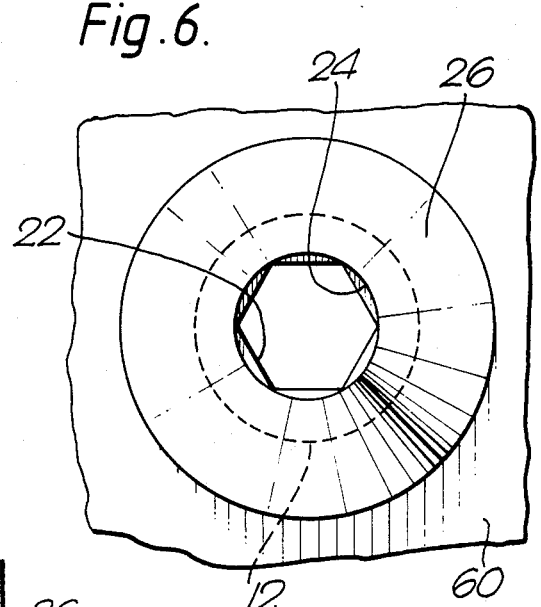

THREADED FASTENER AND METHOD OF INSTALLING SAME

This invention relates to a threaded fastener and to a method of installing the fastener in a workpiece.

The invention is particularly concerned with a threaded fastener which can be installed in threaded engagement with a workpiece without the need to rotate the fastener relative to the workpiece in order to obtain the threaded engagement, and with a method of installing the fastener whereby the installed fastener is modified during installation so as to facilitate its removal from the workpiece by rotation in the manner of a conventional screw.

According to one aspect of the invention there is provided a threaded fastener comprising an elongate shank, a radially enlarged head at one end of the shank, an external screw thread on at least a part of the shank, and a bore within the threaded part of the shank, which bore extends into and through the head, at least the threaded part of the shank of the fastener being capable of being radially expanded and thereby deformed to a stable configuration having a diameter greater than that of the shank before expansion. According to another aspect of the invention there is provided a method of installing a threaded fastener of the invention in an apertured workpiece, which method comprises the steps of inserting the shank of the fastener into an aperture in the workpiece so that at least a part of the screw thread is within the workpiece, and then radially expanding at least a part of the screw-threaded part of the shank which is within the workpiece and thereby causing the screw thread of the fastener to embed in the material of the workpiece.

The expansion of the said part of the shank may be effected by forcing along the bore in the direction from the tail end to the head end a tapered expanding means having a part of non-circular cross-sectional shape and greater transverse dimension than the diameter of the bore of the said part of the shank.

The tapered expanding means used for expanding the said part of the shank may be a tapering enlarged head of a mandrel having a pulling stem, and may be forced along all or part of the bore of the fastener by, for example, pulling the mandrel stem.

According to another particular aspect of the invention there is provided a threaded fastener comprising an elongate shank, a radially enlarged head at one end of the shank, a parallel bore throughout the shank and the head, and a counterbore within the head, the shank being capable of being radially expanded and thereby deformed to a stable configuration having a diameter greater than that of the shank before expansion, characterised in that the shank has a threaded part formed with an external screw-thread having a sharp crest, and an unthreaded cylindrical tail portion remote from the head and having an external diameter less than the major diameter of the threaded part, the shank of which fastener may if desired also have a cylindrical unthreaded part between the threaded part of the shank and the head of the fastener, and the unthreaded part may also have an external diameter less than the major diameter of the threaded part. The workpiece in which a fastener of the invention is to be installed should be of a material which is slightly less hard then the material of the fastener. The fastener is particularly intended for use in soft metals, such as aluminium, and in plastics.

The workpiece should have an aperture into which the shank of the fastener can be inserted, preferably with a minimum of clearance peripherally of the shank, and preferably so that the head rests against the near face of the workpiece. The aperture need not be a through aperture, which is to say that it could be a blind hole, and preferably it should be of uniform diameter.

If another apertured member or members such as, for example a sheet of cladding or a machine component is to be fastened to the workpiece at the same time as the fastener is to be installed in the workpiece, then it should be provided with a through aperture in which the shank of the fastener is a clearance fit, and preferably slightly larger than the aperture in the workpiece. The shank of the fastener is then first passed through the other member or members and into the workpiece. If it is desired to fasten the other member or members closely to the workpiece, play of the other members between the head of the fastener and the workpiece should be reduced to a minimum before expansion of the shank begins. The shank of the fastener should reach sufficiently far into the workpiece for at least a part of the threaded part of the shank to be within the workpiece.

It is then necessary to radially expand at least a part of the threaded part of the shank which is within the workpiece until the thread becomes embedded in the material of the workpiece. This can be achieved in a variety of ways such as, for example the application of extremely high pressure fluid to the bore or by firing or detonation of an explosive charge within the bore, or mechanically by the use of a suitable tool which can be forced into the bore so as to expand the shank.

We prefer to use, for the installation of the fastener, a tool comprising a mandrel which can be pulled into and/or through the bore of the fastener to expand the shank, and an anvil for supporting the fastener against the axial force exerted on it by the mandrel, together with means for pulling the mandrel. Tools of this general kind are well known and only the most important parts are shown in the drawings.

We prefer to install the fastener by pulling a mandrel entirely through the bore in the direction from the tail end to the head end while engaging the head of the fastener with the anvil to support the fastener against the axial force exerted by the mandrel. Furthermore, by using a suitably shaped anvil it is possible to deform a suitably shaped head of a fastener so as to move the periphery of the head relative to the shank in a direction towards the tail end of the fastener which in some situations may be effective to close the distance between the workpiece and the periphery of the head and clamp other members to the workpiece.

Embodiments of the invention will now be described, by way of example, with reference to the accompanying drawings, in which:

FIG. 1 is a side elevation of one form of fastener according to the invention;

FIG. 2 is an end elevation of the fastener of FIG. 1;

FIG. 3 is a side elevation, partly in section, illustrating an early stage in the installation of the fastener of FIG. 1 in a workpiece;

FIG. 4 is a view similar to FIG. 3 showing the completion of the installation;

FIG. 5 is an end elevation of a part of the apparatus seen in FIG. 3;

FIG. 6 is a plan view of the fastener of FIG. 1 after installation;

Figure 7:
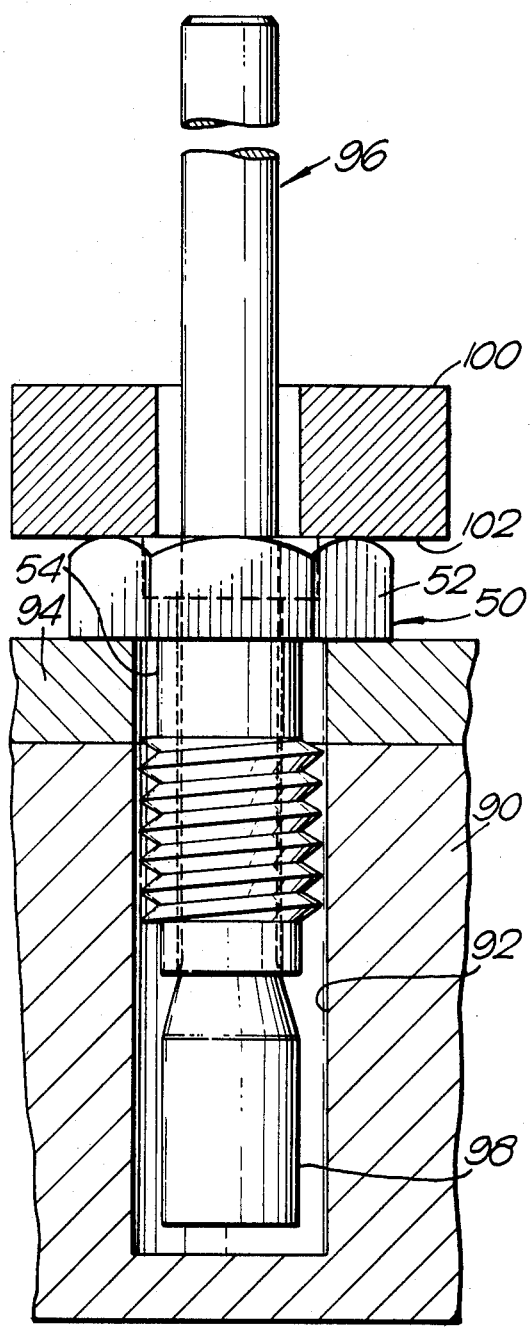
FIG. 7 is a side elevation, partly in section, illustrating another form of fastener according to the invention in an early stage of a simpler form of the method of installation.

A fastener 10 has a somewhat elongate shank 12 of generally cylindrical shape and a radially enlarged head 14 at one end (the head end) of the shank. The external surface of a part 15 of the shank is formed with a screw thread 16 which may be the same as or related to a conventional screw thread of standard form, as will be discussed subsequently. The thread 16 is of V-shape in cross section, and provides a more or less sharp crest 18 at which its flanks meet at an angle of, in this embodiment, 60°, and between adjacent turns of the thread the flanks form a substantially V-shaped trough.

The shank 12 has a tail portion 20 at the end remote from the head 14 (the tail end) to which the thread 16 does not extend. The unthreaded tail portion 20 has a cylindrical external surface having a diameter which is substantially the same as the diameter of the threaded part of the shank taken at the root of the thread 16, (that is, the "minor diameter" of the shank). The thread 16 extends from the tail portion 20 to the head 14.

The fastener has an axial bore 22 throughout the shank and head, the bore being of substantially constant diameter through the shank but having an enlargement in the form of a counterbore 24 at the head end. The length of the counterbore 24 is less than the thickness of the head.

The fastener is formed from cold drawn rod of carbon steel without subsequent heat treatment and is harder than, for example, pure aluminium and a variety of engineering plastics materials such as might form a workpiece in which it might be desired to install the fastener.

The material of the fastener is sufficiently ductile for the shank to be deformed by radial expansion to an extent such that the major diameter of the shank, (that is the diameter taken across the crest of the thread) after expansion is greater than before expansion by at least the depth of the thread and preferably by more than twice the depth of the thread.

In this embodiment, the head 14 is shaped so as to be deformable during installation and has the general shape of a conventional head of the "countersunk" type, which is to say that it has a flat upper surface 26 at the end of the fastener remote from the shank, and a conical underhead surface 28 at which the diameter of the fastener increases, in the direction away from the tail end, from the major diameter of the threaded part of the shank to the maximum diameter of the enlarged head, meeting the upper surface 26 at a peripheral edge 30. The countersunk head 14 is deformable, in a manner which will be explained subsequently, whereby the peripheral part of the head can be moved relative to the shank in a direction towards the tail end of the shank so as to increase the clamping ability of the fastener.

Other embodiments of the invention are possible. By way of example, in FIG. 7, there is shown a fastener 50 which is generally similar to the fastener 10, but in stead of having a countersunk type of head, has a conventional hexagonal bolt head 52, and instead of the thread 16 extending up to the head, the shank has an unthreaded portion 54 adjacent to the head 52.

The diameter of the unthreaded portion 54 is preferably made less than the major diameter of the threaded part of the shank and in this embodiment is the same as the minor diameter of the threaded part in order that it may not interfere after installation, with the walls of the aperture in the workpiece. Furthermore, such an arrangement helps to avoid interference between the shank of the fastener and other members which are secured to a workpiece by means of the fastener.

The provision of the hexagonal head 52 enables the fastener 50 to be engaged and turned on its axis by means of a spanner. This is in contrast to the fastener 10 which is not provided with wrenching surfaces such as are presented by the hexagonal head 52. However, in one embodiment of the method of installing the fastener 10, the bore of the fastener is reshaped to a non-circular shape by deformation during installation so as to provide the bore with wrenching surfaces to permit keying engagement and rotation of the fastener by means of a suitable tool. The installation of the fastener 10 in a workpiece and its use to fasten another member to the workpiece will now be described with reference to FIGS. 3 and 4.

Referring first to FIG. 3, a workpiece 56 in which the fastener 10 is to be installed is in the form of a sheet of alumunium alloy having a through aperture 58 of sufficiently large diameter for the threaded part 15 of the shank to enter with minimum clearance. Another member 60 in the form of a sheet of cladding material is to be fastened to the workpiece by means of the fastener and is provided with a through aperture 62 of sufficiently large diameter for the shank of the fastener to extend there-through with sufficient clearance to permit the shank to be radially expanded, subsequently, to a substantial extent without interfering with the other member 60.

The fastener 10 is installed by means of apparatus comprising a mandrel 64, an annular anvil 66, and means (not shown) for gripping and pulling the mandrel axially relative to the anvil.

The mandrel 64 has an elongate stem 68 which is able to pass with clearance through the bore of the fastener, and an enlarged head 70 at one end of the stem. The mandrel head 70 has a conically tapered portion 72 in which the diameter of the mandrel increases progressively away from the stem 68 to a diameter substantially greater than that of the bore 22 of the fastener, and leads to a somewhat elongate key-forming portion 76 of the head 70, in which the cross-sectional shape of the mandrel is that of a regular hexagon. The mandrel is formed of high tensile steel.

The annular anvil 66 has an axial passage 78 through which the stem of the mandrel can be passed into engagement with the gripping and pulling means, and at its forward end has a flat abutment face 80. In this embodiment, the abutment face 80 of the annular anvil has a central recess 82 of frusto-conical shape peripherally of the passage 78, and the anvil is divided longitudinally of its axis, being formed of two semi-annular jaws 84, 86 which are identical to each other and which cooperate together to form the whole anvil. The jaws are separable diametrically of the axis of the anvil to allow a fastener or a succession of the fasteners according to the invention to be fed forwardly through the separated jaws and along the stem of the mandrel towards the mandrel head 70 and can then be closed together behind the or each fastener in turn so as to cooperate again to provide the abutment face 80.

This aparatus may be used to install fasteners according to the invention in a manner substantially the same as that used in repetition riveting.

Thus, the fastener 10 is fed on to the stem of the mandrel so that the stem extends through the bore 22 and the mandrel head 70 is adjacent the tail end of the fastener but outside the bore, and with the stem of the mandrel passing through the passage 78 of the anvil into engagement with the pulling means so that the fastener is between the mandrel head and the abutment face of the anvil.

A plurality of further fasteners (not shown) may at the same time be disposed on the stem behind the anvil, ready to be fed one at a time through the jaws into position between the mandrel head and the abutment face of the anvil.

The fastener 10 thus associated with the installing apparatus is offered to the work and the mandrel head and tail portion of the fastener are entered through the aperture 62 of the member 60 and into and through the aperture 58 of the workpiece 56 until the anvil pushes the head of the fastener into engagement with the near face of the member 60 and, in turn urges the member 60 into abutment with the near face of the workpiece, thus reducing the play between the head of the fastener and the workpiece.

The installing apparatus is then actuated to pull the mandrel through the fastener, thus drawing the head of the mandrel into the tail end and through the bore while the head of the fastener is supported by the abutment face of the anvil.

It will be appreciated that the tapered portion 72 of the mandrel head leads the key forming portion into the bore of the fastener and as it does so expands the shank progressively from the tail end towards the head. As the hexagonal key-forming portion of the mandrel head enters and passes along the bore it swages or "broaches" (without cutting) and thus imposes a hexagonal or substantially hexagonal cross-sectional shape corresponding to its own on the expanded bore of the fastener.

As the expansion of the shank progresses towards the head of the fastener, there comes a time when the crest 18 of the external thread 16 at the leading end of the progressively expanding part of the shank first engages the material of the workpiece 56 peripherally of the aperture 58 and begins to embed into the material. At this time the axial position of the fastener in the workpiece becomes substantially fixed. Thereafter, the expansion of the shank continues to progress both radially and towards the head of the fastener, causing more turns of the thread to become engaged with the workpiece and to embed more deeply into the material of the workpiece. The progressively increasing interference between the fastener and the workpiece requires that the axial force to be applied to the mandrel has to be increased substantially and progressively, and this of course has to be matched or equalled by the force of reaction of the anvil on the head of the fastener. The result of this reaction is to produce a progressive deformation of the head of the fastener by the anvil. Thus, the peripheral part of the head 14 which is engaged by the abutment face 80 peripherally of the recess begins to deform and move relative to the shank and central part of the fastener head in the direction towards the tail end of the fastener and thus towards the near face of the member 60. Thus, the distance between the periphery of the head 14 an the workpiece 56 which, as previously mentioned, is now fixed relative to the shank, is closed, thus reducing the space available for movement of the member 60 relative to the fastener.

Eventually, the condition shown in FIG. 4 is reached in which the head has been so deformed as to enter fully the recess 82 in the anvil, and the periphery of the head engages the member 60, holding it closely to the workpiece 56. Furthermore, the mandrel head has been pulled entirely through and clear of the bore, and the thread 16 has become embedded to substantially the whole of its depth in the workpiece.

Due to the extra clearance given by the larger diameter aperture 62 in the member 60, the expanded thread does not interfere with the member 60. However, if such interference were desired, the diameter of the aperture 62 could be made the same as that of the aperture 58.

As the original bore 22 through the shank of the fastener was of constant diameter, the shank is expanded evenly along its length and so the external thread, after expansion is of substantially constant diameter throughout the length of the threaded part of the shank.

Once installed, the fastener can be removed from and replaced in the workpiece by rotating it with the aid of a hexagonal key-wrench of suitable size inserted into the now hexagonal bore.

The fact that in the embodiment described the thread of the fastener does not extend entirely to the tail end of the shank helps to avoid the risk of the shank splitting at the tail end when the mandrel head first enters the bore.

The head counterbore 24 serves two purposes: first it serves to accomodate any material which may be swaged along the bore by the mandrel head, and thus avoids the possibility of such material forming a projection from the head, and second it substantially relieves the mandrel of the need to radially expand the head 14, thus reducing the maximum force required to complete installation of the fastener.

There will now be described, by way of further example and with reference to FIGS. 7 and 8, the installation of the fastener 50 in a manner simpler than that described for the fastener 10 although fundamentally the method of installation is the same.

Figure 8:
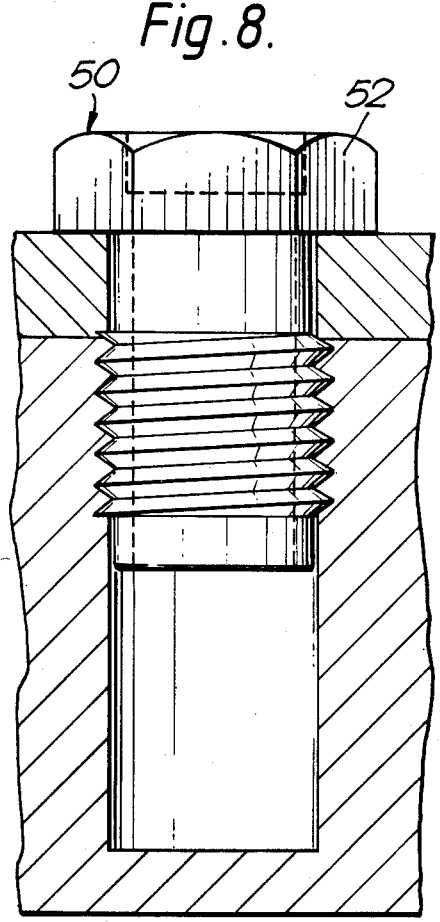
FIG. 8 is a view similar to FIG. 7 showing a later stage in the method.

Thus, referring initially to FIG. 7 to which brief reference has already been made, a number of variations as compared with FIG. 3 are illustrated. Thus, the differences between the fastener 50 and the fastener 10 have already been mentioned. In this example, the fastener 50 is to be installed in a thick workpiece 90 formed of mild steel which is less hard than the fastener, and an other member is to be fastened to the workpiece at the time of installation of the fastener. In stead of a through aperture as in FIG. 3, the workpiece 90 has an aperture 92 in its near face formed as a blind hole.

A mandrel 96 is to be used to install the fastener 50 and although generally similar to the mandrel 40 differs from it in that it has a head 98 which is of circular cross section throughout and is thus not able to impose a non-circular keying shape on the bore of the fastener when pulled along the bore, but serves merely to evenly expand the shank of the fastener radially. In this example, the fact that the head 52 is hexagonal and is thus provided with wrenching surfaces which can be used for rotating the fastener, obviates or at least reduces the need to reshape the bore of the fastener to permit keying engagement by a wrenching tool.

The aperture 92 is made deep enough to accommodate the length of the shank plus the length of the protruding head of the mandrel 96, at least after the shank has passed through the other member 94 which is to be fastened to the workpiece. The other member 94 is formed with an aperture of sufficiently large diameter to allow the threaded part of the shank to be passed through it into the workpiece, and, if the fastener is to be removable easily from the other member also, the aperture should be larger than the thread after expansion of the shank.

If it is not necessary or desirable to clamp the member 94 firmly to the workpiece 90, it is not then necessary to deform the periphery of the head 52, and one can therefore use an anvil 100 having a flat abutment face 102 with no central recess in its abutment face to install the fastener 50.

The fastener 50 is inserted into the apertures in the assembled workpiece and other member and installed by pulling the circular cross sectioned head 98 of the mandrel 96 into and through the bore in a manner similar to that already described, while supporting the head of the fastener with the anvil 100. As in the previous example, the shank is expanded along its whole length, and the thread is caused to embed in the material of the workpiece, cutting or plastically deforming the workpiece in doing so. The head of the fastener is not appreciably deformed.

After installation, the fastener can be removed, by means of a spanner applied to the hexagonal head, and subsequently reinserted if desired.

Other variations are possible in both the fastener and the exemplary methods of installing it.

For example, the fastener 10, in which the thread extends to the head 14, could be installed in a single workpiece without at the same time placing another member between the workpiece and the head of the fastener, since the mating thread formed in the workpiece would extend to the opening of the aperture at the surface of the workpiece and thus allow removal of the fastener.

Although the shank has been described as "elongate" it would be possible to form the fastener with a shank which was of greater external diameter than length. Such a fastener would be useful for fastening two thin plates together.

It may also be desirable to enable the installed fasteners of the invention to be replaced or to be interchangeable with machine screws having standard thread forms. It is possible to achieve this by arranging that the dimensions of the thread of the fastener before installation are such as to yield, after expansion with a mandrel of known dimensions, the desired standard thread form. The required conditions for obtaining a given standard thread can readily be established by experiment using a given mandrel and bearing in mind that the substantial effect of the mandrel is only to radially expand the shank, there being only slight if any axial shortening of the shank during installation. Thus, the number of turns of the thread per unit of length of the shank remains but little changed after installation while the major and minor diameter of the thread are increased substantially.

In stead of the thread on the shank of the fastener forming a V-shaped trough between adjacent turns, the root of the thread could be of "flat-bottomed" form such as is conventionally used for self-tapping screws.

In the examples, the use of a pull-through mandrel has been described but this is not essential. The fastener bore could be closed at the tail end and the fastener could be set by driving an expander tool into the head end of the bore or it could have a headed mandrel assembled with the fastener with the mandrel head disposed in the bore at a position where, on withdrawing the mandrel from the head end, it would then proceed to expand the threaded part of the shank. Although it would generally appear to be desirable to expand the whole of the threadedpart of the shank, it is not essential to expand more than a part of the threaded part of the shank in order to be useful as a fastener, but this will to some extent be dependent upon circumstances. The fastener could have a head of a form other than the hexagonal or countersunk types illustrated, and wrenching surfaces for enabling rotation of the fastener, while not always essential, may be provided in ways other than by the use of a key-forming mandrel to shape the bore or provision of a polygonal bolt head. The head could for example be formed with a recess or slot for receiving a screwdriver of conventional or other form.

We claim:

1. A threaded fastener formed of ductile material, and comprising an elongate, circumferentially entire, tubular shank, and a radially enlarged head at one end of the shank, and having a bore throughout the shank and the head, said bore having a substantially constant diameter throughout the shank and being enlarged within the head by a counterbore, the shank being capable of undergoing radial ductile expansion throughout its length and thus of being deformed to a stable configuration having a diameter greater than that of the shank before expansion, the shank having a cylindrical tail portion remote from the head, and a threaded part between the tail-portion and the head, the threaded part being formed with an external screw-thread having a sharp crest, and said cylindrical tail portion being unthreaded and having an external diameter less than the major diameter of the threaded part.

2. A fastener according to claim 1, wherein the external diameter of the unthreaded tail portion is substantially the same as the minor diameter of the threaded part of the shank.

3. A fastener according to claim 1, wherein a portion of the shank adjacent to the head is unthreaded.

4. A fastener according to claim 3, wherein the unthreaded portion adjacent the head has an external diameter smaller than the major diameter of the externally threaded part of the shank.

5. A fastener according to claim 1, wherein the bore is of circular cross-section.

6. A fastener according to claim 1, wherein the head of the fastener has a conical underhead surface.

7. A fastener according to claim 1, in combination with a pull-through mandrel, said mandrel having a stem extending through the bore and an enlarged mandrel head adjacent the tail end of the fastener, the mandrel head being tapered towards the stem and having a key-forming portion of non-circular cross-section capable, on being forced along the bore of the fastener, of enlarging the bore.

8. A fastener in combination with a pull-through mandrel, according to claim 7, wherein the key-forming portion is of hexagonal cross-section.

* * * * *